United States Patent [19]
Yunker

[11] Patent Number: 6,000,856
[45] Date of Patent: Dec. 14, 1999

[54] MINIATURE ELECTRO-OPTICAL CONNECTOR ASSEMBLY

[75] Inventor: Bryan Yunker, Newark, Calif.

[73] Assignee: Sun Microsystems, Inc., Palo Alto, Calif.

[21] Appl. No.: 09/122,729

[22] Filed: Jul. 27, 1998

[51] Int. Cl.$^6$ ...................................................... G02B 6/38
[52] U.S. Cl. ................................. 385/75; 73/706; 385/147
[58] Field of Search ............................... 73/706, 721, 756, 73/708; 600/561, 488; 360/97.01; 385/94, 88, 89, 90, 75, 130, 147; 257/98, 82; 250/551

[56] References Cited

U.S. PATENT DOCUMENTS

| Re. 33,518 | 1/1991 | McCord et al. ........................... 73/706 |
| 4,513,623 | 4/1985 | Kurtz et al. ............................... 73/721 |
| 4,539,998 | 9/1985 | McCord et al. ......................... 600/488 |
| 4,915,470 | 4/1990 | Moore et al. ............................. 385/94 |
| 5,831,788 | 11/1998 | Hofland ................................ 360/97.01 |

*Primary Examiner*—Akm E. Ullah
*Attorney, Agent, or Firm*—Flehr Hohbach Test Albritton & Herbert LLP

[57] ABSTRACT

An electro-optical transducer connector assembly (10) including an electro-optical transducer (15), a transducer housing (25) having a connector portion (45) that extends through an opening (21) in a wall (12) of the enclosure (11) for an electrical apparatus (8), such as a computer. Transducer assembly (15) preferably is a transceiver which includes a laser diode/photo detector assembly (19) and a printed wiring assembly (17). An optical channel (23) having two fiber optic members (23a, 23b) is releasably mechanically connected by a first connector portion (43) and a second connector portion (45) telescoped inside the first connector portion (43) so as to optically align the fiber optic members (23a, 23b) with the transducer (15). The connector assembly (10) has a small diameter snout (47) which allows the opening (12) in the electromagnetically shielded apparatus (8) to be minimized, and the transducer housing (25) positions the active radiation generating elements of the transducer (15) at a stand-off distance (X) away from the wall opening (12) to reduce EMI as a result of radiation generated by both the transducer assembly (15) and the electrical circuit (13) of the electrical apparatus (8).

28 Claims, 2 Drawing Sheets

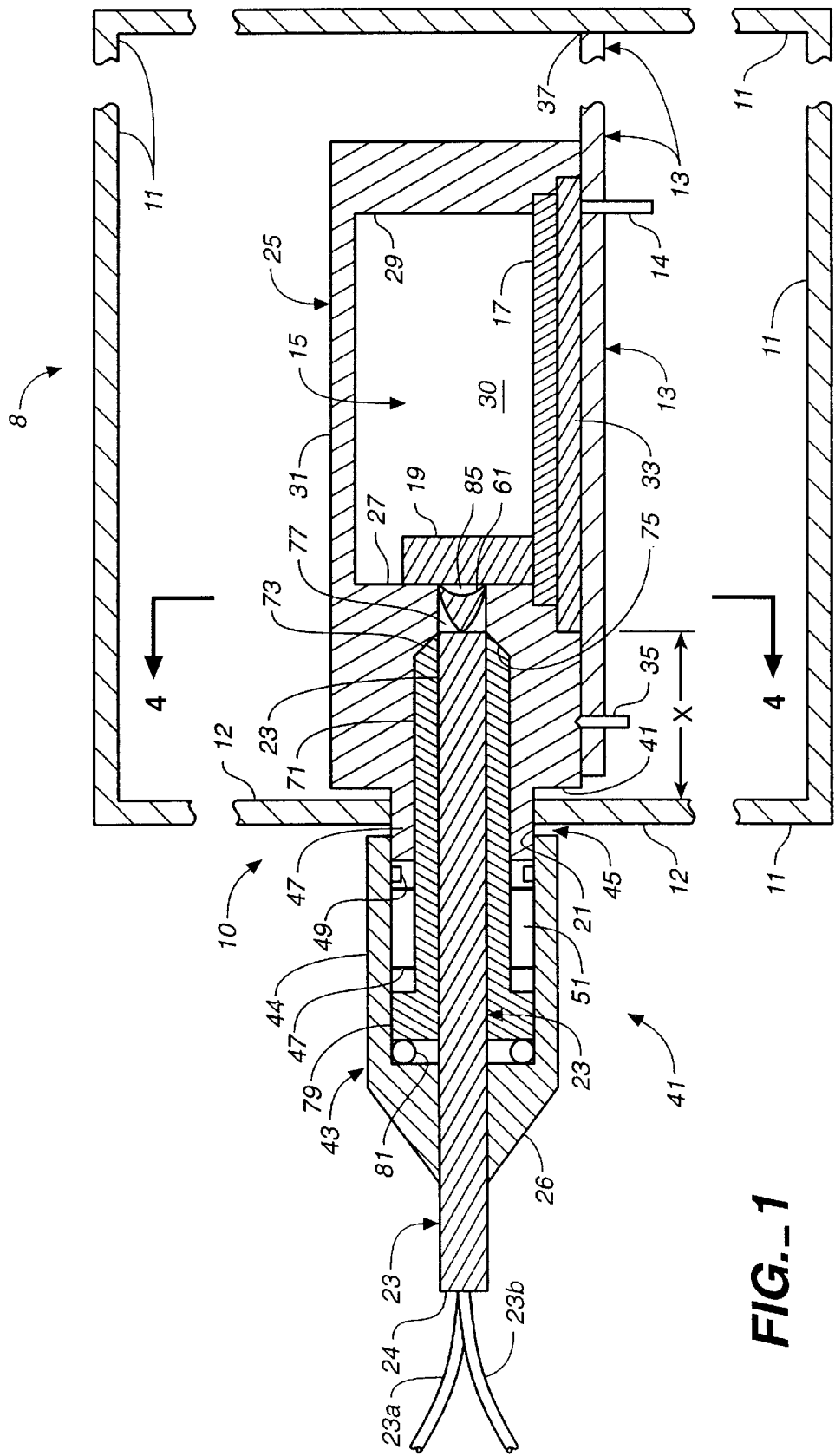
FIG._1

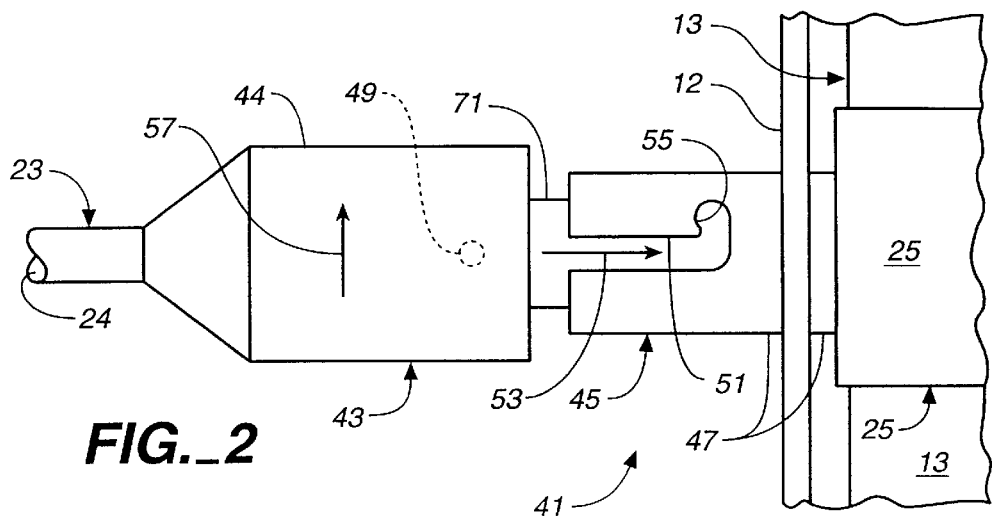
FIG._2
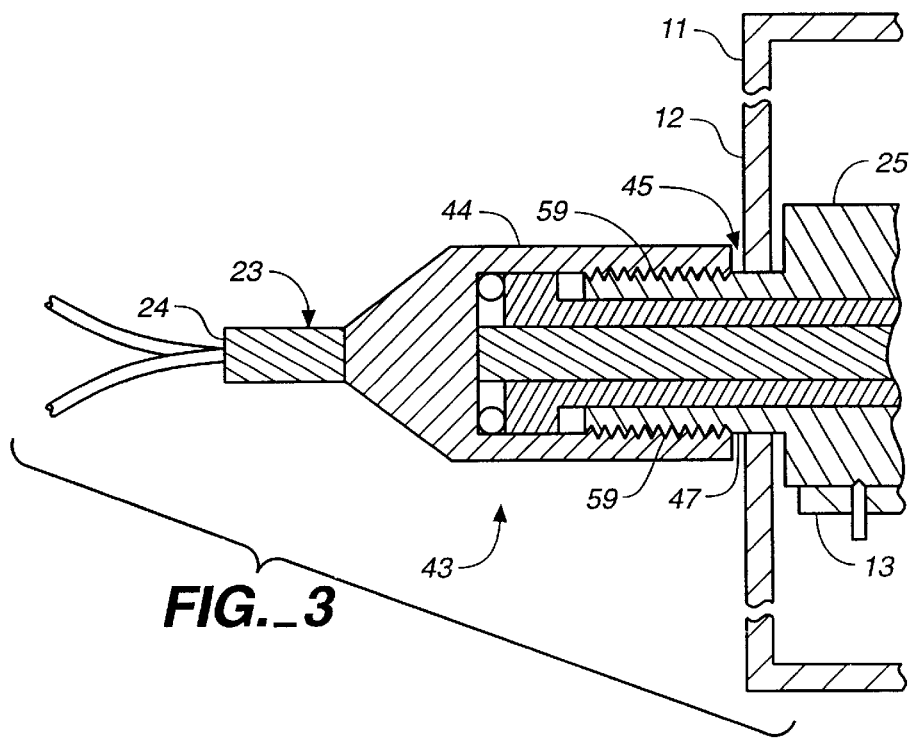
FIG._3
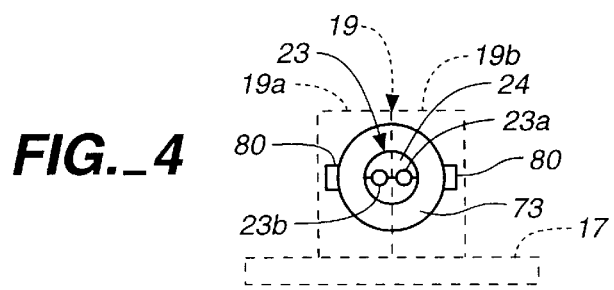
FIG._4

MINIATURE ELECTRO-OPTICAL CONNECTOR ASSEMBLY

TECHNICAL FIELD

The present invention relates to electrical apparatus having an electro-optical transceiver or transducer assembly and to connector assemblies for joining optical circuitry to such electrical apparatus and, more particularly, relates to miniature electro-optical connector assemblies that minimize electromagnetic radiation from the enclosures for electrical apparatus, such as computers.

BACKGROUND ART

Many computers, as well as other high frequency electrical apparatus or equipment, are sources of significant electromagnetic radiation. As a result, there exists extensive legislation regulating the amount of electromagnetic interference ("EMI") which can be emitted from such equipment. In order to meet or comply with EMI regulations, therefore, manufacturers must provide electromagnetic shielding on equipment enclosures. While effective, electromagnetically shielded electrical equipment enclosures will nevertheless require openings for the communication of input and output signals to and/or from the electrical circuit within the enclosure. Thus, the shielded enclosures routinely are provided with input/output openings through which input/output electrical and/or optical cables are connected, often by a releasable connector assembly.

In recent years, it has become highly desirable for various reasons to communicate into and out of such high frequency electrical apparatus, using optical communication cables. Thus, a fiber-optic cable will be releasably connected through an opening in the enclosure or chassis wall to an electro-optical transducer assembly positioned inside the enclosure and electrically coupled to the apparatus circuitry. If the two-way communication of signals is required, an electro-optical transceiver is employed, but as used herein, the expression "transducer" shall broadly include both electro-optical transducers, suitable for one-way communications, and electro-optical transceivers, suitable for two-way communications.

Electro-optical transducers include their own electrical circuitry, which often operates at a significantly higher switching frequency than the other electrical circuit functions in the equipment. Thus, a computer may operate at a clock or bus switching frequency of 250 MHz, while the electro-optical transducer coupled to the computer electrical circuit is operating at 500 MHz or more. Moreover, the transducer assembly will be a source of harmonic energy radiation at frequencies up to the 5 to 6 GHz range for a fundamental clock rate of 500 MHz. EMI problems increase as the radiation source frequency increases since containing the radiation becomes more difficult as the frequency wavelength shortens and smaller and smaller circuitry elements become effective antennas and smaller enclosure features become antennas.

Shielding the basic high frequency electrical circuit, therefore, is not enough; steps also need to be taken to shield communications transducers and to minimize the size and number of openings which are present in the enclosure for the electrical apparatus to accommodate such transducers. Still further, communication cables for electrical apparatus must be easily disconnected from and connected to the electrical apparatus, and they must be capable of withstanding axial and transverse loading during normal use without becoming mechanically or optically uncoupled from the basic system circuitry.

Prior art electro-optical connector assemblies are known in which the mating connector blocks are employed to join a fiber-optic cables together at the computer chassis wall. Such systems, however, have employed undesirably large openings through the computer wall or have positioned the electro-optical transducer assembly undesirably close to the opening for the cable, or both. Prior connector assemblies for electro-optical transducers also have contained ungrounded or protruding metal components which can re-radiate energy present in the transducer assembly. Other disadvantages of prior electro-optical connector assemblies have included their high cost, difficulty in maintaining optical alignment, and large size (which limits the number of input/output connections).

The present invention solves many of these problems and drawbacks of current electro-optical connectors with a design that is relatively elegant in its simplicity, easy and inexpensive to manufacture, and reliable in its operation.

DISCLOSURE OF INVENTION

The present invention includes an electrical apparatus having a miniature or small electro-optical connector assembly and the electro-optical connector assembly itself. The electrical apparatus comprises, briefly, an electrical circuit including a source of electromagnetic radiation, an enclosure formed to provide electromagnetic shielding and having a wall with an opening therein; an electro-optical transducer assembly located within the enclosure; an electromagnetically shielded transducer housing substantially surrounding the transducer assembly; an optical communications channel; and a connector assembly including a first connector portion (a socket) carried by the optical channel and a second connector portion (a snout) releasably connecting the first connection portion to the transducer assembly for optical coupling of the optical channel to the transducer assembly through the opening in the apparatus enclosure. In the preferred embodiment, the transducer is provided by an electro-optical transceiver which is adapted to receive optical signals from a fiber-optic cable and to convert the optical signals to electrical signals. The transceiver also receives electrical signals from the electrical circuit and converts the signals to optical signals for transmission in an opposite direction through a second fiber in the fiber-optic cable.

The transducer housing mounts directly over the printed wiring assembly for the transducer, and the housing is further preferably formed with a snout extending out an opening in the computer chassis wall. The transducer housing also positions the transducer assembly inward of, or spaced by a stand-off distance from, the opening, and the snout may be relatively small or miniature in its diameter or transverse dimension. The opening in the enclosure wall, therefore, has a widest diameter that preferably is not greater than one-half of one-tenth of the wavelength of the highest frequency electromagnetic radiation from the transducer assembly. For sources having frequencies near 500 MHz, which may have harmonics near 6 GHz, the desired opening is less than 4 mm to block electromagnetic radiation through the opening.

The transducer housing may also, but not necessarily, be made of a non-metallic material, preferably a carbon-loaded plastic, as an additional radiation control feature. When the snout is made of carbon-loaded plastic, the snout acts as a controlled aperture wave guide, such that high frequency electromagnetic energy does not readily excite the wave guide and propagate along the snout and through the chassis wall opening. The carbon also provides a lossy medium which reduces signal energy by absorption.

These and other features, objects, and advantages of the present invention will become apparent from the following description of the Best Mode for Carrying Out the Invention, when read in conjunction with the accompanying drawings, and the claims, which are all incorporated herein as part of the disclosure of the invention.

BRIEF DESCRIPTION OF THE DRAWINGS

Throughout the several views, like reference numerals refer to like parts, wherein:

FIG. 1 is a schematic, side elevation view, in cross section of an electrical apparatus having an electro-optical connector assembly constructed in accordance with the present invention.

FIG. 2 is a fragmentary, top plan view of the assembly of FIG. 1 with the connector components partially assembled.

FIG. 3 is a schematic, fragmentary, side elevation view of an alternative embodiment of the connector assembly of the present invention.

FIG. 4 is an end elevation view of the cable-carrying biasing sleeve taken substantially along the plane of line 4—4 in FIG. 1.

BEST MODE OF CARRYING OUT THE INVENTION

Reference will now be made in detail to the preferred embodiments of the invention, examples of which are illustrated in the accompanying drawings. While the invention will be described in conjunction with the preferred embodiments, it will be understood that the described embodiments are not intended to limit the invention specifically to those embodiments. On the contrary, the invention is intended to cover alternatives, modifications and equivalents, which may be included within the spirit and scope of the invention as defined by the appended claims.

Referring to FIG. 1, an electrical apparatus, generally designated 8, which has an electro-optical transducer assembly, generally designated 10, mounted thereto, is shown. The electrical apparatus most preferably will be a computer, but other electrical equipment and electrical devices which operate at high enough frequencies and power levels to produce significant electromagnetic radiation requiring EMI compliance are within the spirit and scope of the present invention. Electrical apparatus 8 will include an electrical circuit, which can take many forms and include many components but is here schematically shown as a printed wiring board ("PWB"), generally designated 13.

Mounted to extend around electrical apparatus 8 is an apparatus enclosure 11, which is formed to provide electromagnetic shielding for electrical circuit 13. Enclosure 11 extends substantially entirely around circuit 13 so as to prevent, or greatly reduce, the emission of electromagnetic radiation from apparatus 8 due to circuit 13. Shielding can be provided by the material from which enclosure 11 is formed and/or by shielding liners, as is well known in the art.

Carried by host PWB 13, and electrically connected thereto by pin or pins 14, is an electro-optical transducer assembly, generally designated 15. Transducer assembly 15 includes its own printed wiring assembly ("PWA") 17, and as above-noted, transducer 15 may be a one-way transducer or, in the preferred form, a two-way transceiver. When transducer 15 is provided by a transceiver a photo-detector 19a and a laser diode or LED 19b (FIG. 4) can comprise transducer 19. The electro-optical transducer assembly 15, therefore, includes both transducer 19 and supportive PWA circuitry 17.

The normal transceiving operations of transducer assembly 15, however, create electromagnetic radiation in addition to that created by electrical circuit 13, and often such radiation is at higher frequencies and accordingly is harder to contain in enclosure 11. Moreover, as will be seen in FIG. 1, an opening or port 21 must be provided in enclosure or chassis wall 12 in order that an optical channel or cable 23 can be connected for the communication of signals to and/or from electrical circuit 13. Thus, inherently, there will be an EMI source 15 proximate a round or rectangular opening 21 in the otherwise electromagnetically shielded enclosure 11.

In order to prevent radiation emissions, while providing an easily releasable connector assembly for connecting optical communications cable 23 to electrical circuit 13, connector assembly 10 of the present invention includes two connector portions which couple the optical cable to the transducer assembly. Connector assembly 10 includes a first connector portion 43 carried by optical channel or cable 23 and a second connector portion 45. In the preferred form, first connector portion 43 is a socket assembly 44, while second connector portion 45 is provided as an annular projection or snout 47 extending outwardly from the front of a transducer housing assembly 25. The first and second connector portions 43 and 45 are formed for releasable connection to each other and are further formed to optically couple channel 23 to transducer 15 for the communication of optical signals along channel 23.

Moreover and very importantly, connector assembly 10 is constructed in a manner which allows opening 21 in the assembly enclosure wall 12 to be sufficiently small so that electromagnetic radiation having frequencies up to, but not limited to, 5 to 6 GHz to be blocked by the size of opening 21. Thus, snout 47 is a small or miniature snout which is slidably engaged through opening 21, while socket 43 is mounted over the protruding end of snout 47 outside enclosure 11. This structure allows opening 21 to be 4 millimeters or less in diameter (transverse dimension if not round), which will effectively prevent longer wavelength radiation from escaping enclosure 11 through opening 21. A 4 millimeter opening is one-half of one-tenth of the wavelength of 6 GHz frequency, as an example.

Moreover, in order to provide additional shielding, the miniature connector assembly of the present invention includes a transducer housing 25 is mounted inside apparatus enclosure 11 and substantially surrounding and enclosing transducer assembly 15. Thus, housing 25 includes a front wall 27, rear wall 29, opposed side walls 30, upper wall 31 and bottom wall 33, provided by a sealing compound placed between PWB 13 and PWA 17. All the housing walls may be formed of a non-metallic or a metallic material, to provide electromagnetic shielding as necessary. Most preferably, plastics are used for the housing walls, except possibly bottom sealant layer 33 of epoxy, either of which may be carbon-loaded for shielding effect. Housing 25 for electro-optical transducer 15 may be mechanically aligned and coupled to host PWB 13 by a mounting pin 35. PWB 13 is supported from electrical apparatus enclosure or chassis 11, as is appropriate for mechanical rigidity and as is only schematically indicated at 37. Additionally, housing 25 provides a shoulder 41 which extends laterally of opening 21 by a significant distance to provide further shielding of opening 21 from radiation generated by PWB 13.

Releasable connection of first and second connector portions 43 and 45 can be accomplished in several manners, but in the embodiment of FIGS. 1 and 2, a bayonet or twist-type connection is employed having mating bayonet elements. As will be seen, snout 47 and socket 44 are telescopically interengaged. One of these two members may carry a pair of opposed pins 49, while the other may be formed with bayonet channels 51. As shown in the drawing, pins 49 are carried by socket 44 while channels 51 are formed in snout 47, but these elements could be reversed.

As best may be seen in FIG. 2, therefore, socket 44 may be axially slidably mounted over snout 47, as indicated by arrow 53. Pins 49 are aligned with and axially slid along channels 51 until the pins reach the end of the channels. The socket is then twisted to seat pins 49 in recesses 55, as indicated by arrow 57. As will be understood, an oppositely extending channel 51 and recess 55 are provided in the other side of snout 47.

Alternatively, as shown in FIG. 3, first connector portion 43 may be releasably connected to second connector portion 45 by mating threads 59. Thus, socket 44 and snout 47 may both be provided with threads 59. This embodiment, of course, requires more rotations of socket 44. Socket 44, however, is only slidably mounted on cable sheathing 24 and accordingly, socket 44 can be rotated without twisting optical cable 23.

Sharp bending of optical channel 23 at socket 44 is resisted by a combination of flexible cable sheathing 24 and a tapering strain-relieving nose portion 26 of socket 44. The strain-relieving nose 26 of socket 44 will flex in combination with flexing of the cable sheathing to smooth bends at the juncture of the sheathing with the socket assembly. Thus, fiber members 23a and 23b are less likely to become kinked or fractured by transverse bending of the optic channel at connector assembly 10.

Optic channel 23 can be seen from FIG. 1 to extend inwardly through socket 44 and snout 47 to terminate in an inner end 61 which is axially inward of opening 21 in the apparatus enclosure or chassis wall 12 by a substantial stand-off distance X. Since attenuation of electromagnetic radiation is a function of the square of the distance from the radiation source, housing 25 in the present invention is formed to position transducer assembly 19 and PWA 17 as far away from opening 21 as is reasonably possible. Typically, stand-off distance X will be 10–12 millimeters, or more, away from opening 21. Since a common length for host PWB 13 is 32 millimeters, a stand-off of about 10–12 millimeters will be typical for mounting of housing 25 to PWB 13. Of course stand-off distance X may be larger depending upon the application, size and layout of PWB 13. Rather than try to couple the optical cable to the electrical apparatus by a connection located at or outside wall 12, therefore, the present connector assembly 10 is formed to allow optical cable 23 to extend through wall 12 by a significant stand-off distance, and housing 25 is formed and mounted by pin 35 to PWB 13 so as to position the active components of the electromagnetically emitting transducer assembly 15 at a spaced stand-off distance X from enclosure opening 21.

Moreover, first and second connector portions 43 and 45 are telescopically interengaged around fiber optic cable 23 so as to form a wave guide of substantial length. Such a wave guide will be more difficult to excite sufficiently so as to allow electromagnetic radiation to travel down connector assembly 10 and out through opening 21. Still further, housing 25, and all of the connector components between electro-optical transducer assembly 15 and opening 21 (the stand-off distance X), are preferably non-metallic, or metallic and 360° connected to the chassis opening, so as to prevent re-radiation of electromagnetic radiation produced by the transducer assembly. Most preferably, these components and the telescopically interengaged snout and socket assembly are formed of carbon-loaded or embedded plastics to attenuate the radiating energy.

One of the significant problems faced by prior connector assemblies is the problem of maintaining a good optical connection under axial and transverse loading of the connector assembly which can occur during normal use. Connector assembly 10 of the present invention achieves that end by forming connector assembly 41 with mating seating surfaces and guide pins and channels that position optical cable end 61 in alignment with the photo-detector and laser diode assembly 19.

Referring to FIGS. 1 and 4, socket assembly 44 can be seen to include a T-shaped sleeve 71 that is slidably and telescopically mounted inside snout 47. Sleeve 71 is mounted on and bonded to cable 23 so that axial forces on sleeve 71 will urge cable end 61 toward transducer assembly 15. An inwardly tapered end 73 is provided on sleeve 71 to matingly engage a convergently tapered seat surface 75 provided in transducer housing 25. An axially extending short channel 77 extends between the mating seating surfaces 73 and 75 to transducer assembly 19. An enlarged opposite end 79 of sleeve 71 slidable engages the bore of socket 44, and sleeve 71 and cable 23 are biased toward seat surface 75 by O-ring biasing device 81, which also tends to cause the bayonet elements to be biased into a latched condition by pulling pin 49 into recess 55 (as shown in FIG. 2). Other spring biasing devices could be used.

When two optic fiber members and a transceiver having two transducers are employed, rotation of sleeve 71 must be resisted to assure proper alignment. Thus, fibers 23a and 23b need to be aligned with photo-detector 19a and laser diode 19b. At least one, and preferably a pair of guide pins or ribs 80 can be provided on the sides of sleeve 77, as is best seen in FIG. 4. Pins or ribs 80 slide in guide channels (not shown) provided in snout 47 and housing 25. Obviously the pin and channel guiding of sleeve 71 and cable 23 could be reversed by providing a channel on the sleeve and a pin on the snout.

The combination of telescoped sleeve 71 and snout 47, as well as guide pins 80 and mating sleeve end 73 and seating surface 75, provide precise optical alignment of lenses 85 for photo-detector 19a and laser diode 19b, with fiber optic members 23a and 23b. The telescoped sleeve 71 and snout 47 also provide substantial strength for connector assembly 10 against bending about opening 21 in the chassis wall. Axially loads are resisted by the bayonet connector and the ability of the sleeve to move slightly outwardly against the biasing O-ring and then to be displaced back into seated registration with transducer assembly 19.

Providing dual optical fibers 23a and 23b in cable 23 doubles the communication density of connection 10 and requires only one opening or aperture 21 in chassis wall 12. By contrast, some prior art optical connectors have only one optical fiber for each connector assembly. Fiber members 23a and 23b can be laid in grooves provided in two halves of sheathing 24.

Electro-optical transducer connector assembly 10 allows duplex optical connection through a computer chassis enclosure through a small opening that preferably is below the size of the cutoff wavelength for frequencies of concern, for example 6 GHz. Connector assembly 10 positions the transducer radiation source at a stand-off distance from the enclosure opening or aperture and provides a shielding housing assembly for the transducer. It also provides scalable medium density interconnect, and reduces or eliminates the need for further EMI shielding. It also provides mechanical strength and reduces tolerance problems of current optical connectors.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described to best explain the principles of the invention and its practical application, to thereby enable others skilled in the art to best utilize the invention and various embodiments with various modifications as are suited to the particular use contemplated. It is intended that the scope of the invention be defined by the claims appended hereto when read and interpreted according to accepted legal principles such as the doctrine of equivalents and reversal of parts.

The invention claimed is:

1. An electrical apparatus comprising:

an electrical circuit including a source of electromagnetic radiation;

an apparatus enclosure formed to provide electromagnetic shielding and substantially surrounding and enclosing said electrical circuit, said enclosure having a wall with an opening therethrough;

an electro-optical transducer assembly mounted in said enclosure and electrically connected to said electrical circuit;

a transducer housing mounted inside said enclosure and extending around and substantially enclosing said transducer assembly, said transducer housing being formed of an electromagnetic shielding material;

an optical channel; and a connector assembly including a first connector portion carried by said optical channel and a second connector portion releasably connecting said first connection portion to the transducer assembly for optical coupling of said optical channel to said transducer assembly through said opening in said wall.

2. The electrical apparatus as defined in claim 1 wherein, said first connector portion and said second connector portion are telescopically interengaged members, and one of said telescopically interengaged members is slidably mounted through said opening.

3. The electrical apparatus as defined in claim 2 wherein, said second connector portion carried by said transducer housing assembly.

4. The electrical apparatus as defined in claim 2 wherein, said first connector portion and said second connector portion are threadably interengaged.

5. The electrical apparatus as defined in claim 2 wherein, said first connector portion and said second connector portion are connected together by mating bayonet elements.

6. The electrical apparatus as defined in claim 2 wherein, said first connector portion and said second connector portion are connected together by mating elements spring biased into a latched condition.

7. The electrical apparatus as defined in claim 1 wherein, said opening has a diameter less than about one-half of one-tenth of the wavelength of frequencies associated with said electro-optical transducer assembly.

8. The electrical apparatus as defined in claim 2 wherein, said opening has a diameter less than about 4 millimeters.

9. The electrical apparatus as defined in claim 1 wherein, said transducer housing is formed to position said electro-optical transducer assembly at least about 10 millimeters inwardly from said opening in said enclosure; and said transducer housing includes substantially no metallic components between said transducer assembly and said opening.

10. The electrical apparatus as defined in claim 1 wherein, said first connector portion is provided as a socket member; and said second connector portion is provided as a snout.

11. The electrical apparatus as defined in claim 10 wherein, said snout extends from said transducer housing outwardly through said opening in sliding engagement with said wall defining said opening; and said socket is telescopically engaged over said snout.

12. The electrical apparatus as defined in claim 1 wherein, said transducer assembly includes an electro-optical transceiver;

said optical channel is provided by a plurality of fiber optic members; and said electrical circuit is a computer circuit.

13. An electric-optical connector assembly comprising:

an electro-optical transducer assembly formed for electrical connection to an electrical circuit;

a transducer housing substantially enclosing said transducer assembly and formed of an electromagnetically shielding material;

an optical channel;

a first connector portion carried by said optical channel;

a second connector portion carried by said transducer housing; and said first connector portion and said second connector portion being telescopically and releasably interengaged and being formed mounting through an opening in a chassis wall of an electrical apparatus.

14. The connector assembly as defined in claim 13 wherein, said second connector portion is provided as a snout formed to slidably engage the chassis wall defining the opening.

15. The connector assembly as defined in claim 14 wherein, said first connector portion is provided by a socket assembly telescopically receiving said snout on an exterior side of the chassis wall.

16. The connector assembly as defined in claim 15 wherein, said socket assembly includes a sleeve member mounted on said optical channel and telescopically received for guided axial movement inside said snout.

17. The connector assembly as defined in claim 16 wherein, said optical channel is provided by at least one fiber optic member; and said sleeve member is formed to align said fiber optic member with said transducer assembly for communication of optical signals therebetween upon connection of said socket assembly with said snout.

18. The connector assembly as defined in claim 17 wherein, said optical channel is provided by a plurality of fiber optic members;

said transducer assembly includes an electro-optical transceiver; and said sleeve and said snout are formed to prevent rotation of said sleeve relative to said snout.

19. The connector assembly as defined in claim 17 wherein, an inner end of said sleeve member matingly engages a tapered seat provided in said housing.

20. The connector assembly as defined in claim 19 wherein, said sleeve is slidably carried in said socket assembly and is resiliently biased toward said sleeve.

21. The connector assembly as defined in claim 20 wherein, said sleeve is formed with a T-shaped outer end and is resiliently biased toward said seat by an O-ring.

22. The connector assembly as defined in claim 13 wherein, said transducer housing in non-metallic.

23. The connector assembly as defined in claim 22 wherein, said transducer housing is made of a carbon-embedded plastic.

24. The connector assembly as defined in claim 13 wherein, one of said first connector portion and said second connector portion is dimensioned to slidably pass through an opening less than one-half of one-tenth of the wavelength of the highest frequency of electrical signals and harmonics produced by said transducer assembly.

25. The connector assembly as defined in claim 13 wherein, said connector portion is dimensioned to slidably pass through an opening having a diameter less than about 4 millimeters.

26. The connector assembly as defined in claim 13 wherein, said housing proximate said second connector has a shoulder dimensioned to be larger than said opening.

27. The connector assembly as defined in claim 13 wherein, said housing is formed to space said transducer assembly from the chassis wall by a distance of at least 10 millimeters.

28. The connector assembly as defined in claim 13 wherein, said first connector portion includes a stress-relieving structure between said optical channel and a remainder of said first connector portion.

* * * * *